Aug. 8, 1950

W. SMITH 2,518,085

POULTRY FEEDER

Filed March 8, 1946

Inventor
WARREN SMITH,

By *McMorris Bowman and Darden*

Attorneys

Patented Aug. 8, 1950

2,518,085

UNITED STATES PATENT OFFICE 2,518,085

POULTRY FEEDER

Warren Smith, Criders, Va.

Application March 8, 1946, Serial No. 652,947

1 Claim. (Cl. 119—61)

My invention relates to poultry feeders and more particularly to adjustable feeders.

The object of my invention is to provide a poultry feeder the sides whereof can be adjusted so that the feeder can be used to feed chicks from one day to six weeks old, or to feed chickens six weeks to eleven weeks of age, or to feed broilers.

Another object of my invention is to provide a poultry feeder which is adjustable on its supports to be arranged to a desired height to feed pullets and layers.

Other objects of my invention may appear in the following specification describing it with reference to the accompanying drawing illustrating a preferred embodiment thereof. It is, however, to be understood that my invention is not to be limited or restricted to the exact construction and combination of parts described in the specification and shown in the drawing, but that such changes and modifications can be made which fall within the scope of the claim appended hereto:

Figure 1:
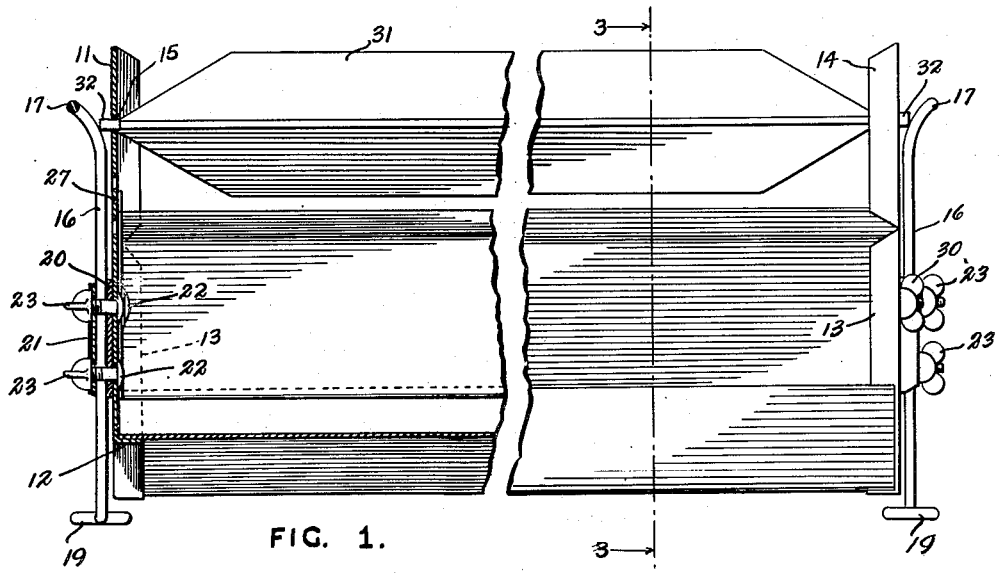
Figure 1 is a side elevation of a poultry feeder according to my invention, partly shown in section.

Referring now to the drawing in detail the poultry feeder according to my invention has a body 10 having a W-shaped cross section providing a pair of parallel spaced troughs. On each end of the body 10 an end wall 11 is firmly fastened to the body. On the bottom each wall is shaped to fit onto the middle portion of the W-shaped body and has two inwardly extending flanges 12 thereon which abut the outside surfaces of the middle portion of the W-shaped body, but otherwise each end wall has the outlines of a pentagon. The flanges 12 are welded to the adjacent portions of the body. On each upwardly and outwardly extending edge of each end wall an inwardly extending flange 13 is formed. The lower ends of these flanges abut the inside surfaces of the outer members of the W-shaped body and are welded thereon. On each upwardly and inwardly extending end wall edge an inwardly extending flange 14 is formed.

On the vertical centerline of each end wall a plurality of holes 15 is provided at regular intervals from each other.

Two supports 16 are provided for the feeder. Each support is made from a continuous piece of wire. This wire is bent downwardly upon itself at 17 to form two uprights 18. At the bottom end of these uprights the wire is bent outwardly at right angles, and at the ends horizontally arranged loops 19 are formed serving as legs for the support.

A channel shaped clamping member 20 is adapted to receive the two uprights 18 of each support 16 therein and a smaller channel-shaped clamping member 21 fits into the member 20 and over the uprights 18. Two holes are provided in the two clamping members on the longitudinal center line thereof and at the same distance from each other as the holes 15 in the end-walls 11. Round headed stove bolts 22 extend through two of these holes 15 and the holes in the clamping members, and wing nuts 23 on the bolts are adapted to clamp the supports and the body together. Two angle shaped side wall members or panels 24 have a long leg 25 and a short leg 26 and on each end of each side wall member an end piece 27 is formed extending at right angles to the two legs.

Each end piece 27 is provided with an angular slot 28. Two holes are provided in each end wall 11 at approximately the same height as the second hole 15 counting from the bottom and at an equal distance outwardly therefrom. A round headed stove bolt 29 extends through each of said holes and the adjacent angular slot supporting the side wall members adjustably. Wing nuts 30 on the bolts 29 are adapted to secure the side wall members in adjusted position. A cross shaped top member 31 is rotatably supported in the uppermost holes 15 in the end walls 11 by means of pins 32.

This top member prevents chickens from roosting on top of the feeder on account of its rotatability.

Figure 3:
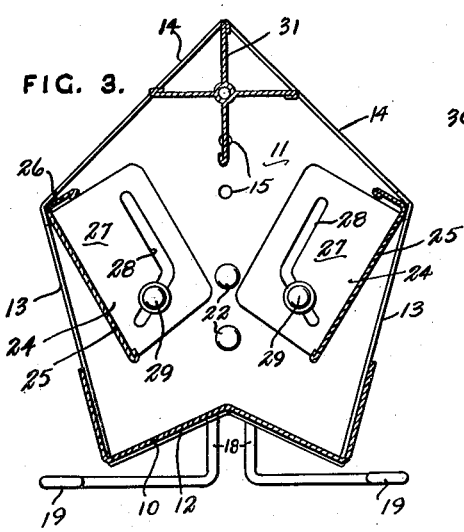
Figure 3 is a sectional view taken on line 3—3 in Figure 1.
Figure 2:
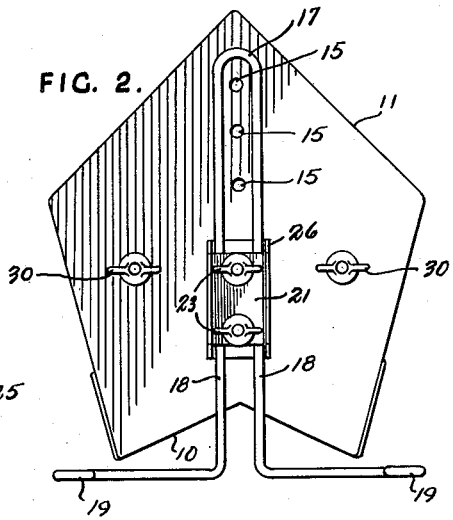
Figure 2 is an end view of the poultry feeder shown in Figure 1.

The feeder is shown in the drawing in adjusted position for feeding chicks one day to six weeks old. The outside members of the W-shaped body are low enough to permit such small chicks to reach over these members into the feeder for their feed. It will be seen in Figure 3 that the side panels 24 have their lower portions disposed inwardly to permit such access.

The side wall members 24 are then adjusted by loosening the wing nuts 30 and moving the members so that the end of the long leg 25 rests on the bottom of the body. In this adjustment the feeder is arranged for chickens from six to eleven weeks of age.

To feed broilers the side wall members are adjusted so that the long legs form continuations of the outside members of W-shaped body and the short legs 26 abut the flanges 15 on the end walls 11.

The adjustment to feed pullets and layers is made by loosening the wing nuts 23 thereby permitting the upright supports to be slid downwardly in the clamps 20—21 so that the whole feeder body will be arranged at a higher level. If necessary the clamping members can be attached to the body at a higher level by using two holes 15 located at a higher level.

The W-shape of the feeder body has the advantage that the raised oppositely inclined center portion will direct and retain chicken feed in both troughs so that chicks can reach it easily from both sides.

Having described my invention I claim and desire to secure by Letters Patent:

A poultry feeder comprising a vertically-disposed base of W-shaped cross-section, a first end wall positioned adjacent one end of said base and fixedly secured to the latter, a second end wall positioned adjacent the other end of said base and fixedly secured to the latter, the W-shaped base in conjunction with the first and second end walls forming a pair of troughs for the reception of feed therein, a first panel positioned above one of said troughs and mounted on said first and second end walls for sliding and swinging movement with respect to the top of said trough, a second panel positioned above the other of said troughs and mounted on said first and second end walls for sliding and swinging movement with respect to the top of said trough, each of said first and second panels embodying two end pieces and a cross-piece interposed between said end pieces and connected thereto, each end piece being provided with an angular slot, the slots in the end pieces being in aligned relation with respect to each other, and means extending through the slots in each end piece and fixedly secured to the end wall adjacent thereto for fixedly positioning each of said panels in a select point of movement.

WARREN SMITH.

REFERENCES CITED

The following references are of record in the file of this patent:

UNITED STATES PATENTS

| Number | Name | Date |
|---|---|---|
| 458,031 | Kelso | Aug. 18, 1891 |
| 1,855,781 | Tolley | Apr. 26, 1932 |
| 2,136,587 | Gaskill | Nov. 15, 1938 |
| 2,165,968 | Hill | July 11, 1939 |
| 2,221,013 | White | Nov. 12, 1940 |
| 2,278,281 | Plante | Mar. 31, 1942 |
| 2,308,701 | Martin | Jan. 19, 1943 |
| 2,321,877 | Troyer | June 15, 1943 |